US000001061H

United States Statutory Invention Registration [19]

[11] Reg. Number: H1061

Rozner et al.

[43] Published: Jun. 2, 1992

[54] COMPOSITE SHIELDS

[75] Inventors: Alexander G. Rozner, Potomac; James C. Waldron, Silver Spring; William R. Walton, Clarksville, all of Md.

[73] Assignee: The United States of America as represented by the Secretary of the Navy, Washington, D.C.

[21] Appl. No.: 520,275

[22] Filed: Jun. 29, 1983

[51] Int. Cl.[5] ..... F41H 5/04

[52] U.S. Cl. ..... 89/36.02; 109/82; 428/412; 428/463; 428/911

[58] Field of Search ..... 89/36.02; 109/78, 80, 109/82, 84; 428/412, 461, 462, 463, 911

[56] References Cited

U.S. PATENT DOCUMENTS

| | | | |
|---|---|---|---|
| 2,279,110 | 4/1942 | Collins | 109/82 |
| 2,348,130 | 5/1944 | Hardy | 89/36.02 |
| 2,723,214 | 11/1955 | Meyer | 89/36.02 |
| 3,179,553 | 4/1965 | Franklin | 89/36 A |
| 3,382,136 | 1/1962 | Bugel et al. | 428/461 |
| 3,634,177 | 1/1972 | Glaser | 89/36.02 |
| 4,424,254 | 1/1984 | Hedrick et al. | 428/412 |

FOREIGN PATENT DOCUMENTS

| | | | |
|---|---|---|---|
| 1386794 | 3/1975 | United Kingdom | 428/461 |

OTHER PUBLICATIONS

Chemical Abstract: vol. 85, 1976, No. 129377, "Bullet--proof glass," Evers Fritz.

Chemical Abstract: vol. 91, 1979, No. 25995, "Transparent ceramic armor," Ballard, C. P. Jr.

Chemical Abstract: vol. 76, 1972, No. 128354, "Lightweight, transparent, penetration-resistant laminated structures", Glaser, John H.

Chemical Abstract: vol. 39, (1945) No. 3240, "Method of making layered armors," Paul Schwarzkopf.

Chemical Abstract: vol. 36, 1942, No. 5130, "Armor plate formed of a plurality of bonded steel sheets", Allan J. Collins.

Chemical Abstract: vol. 39, 1945, No. 137, "Laminated armor plating," Charles J. Hardy, Jr.

*Primary Examiner*—Stephen C. Bentley

*Attorney, Agent, or Firm*—Kenneth E. Walden; Roger D. Johnson

[57] ABSTRACT

A composite armor shield comprising alternating layers of steel and a polymeric material which is either a polymethyl methacrylate of the general formula or a polycarbonate of the general formula

9 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FIG. 1
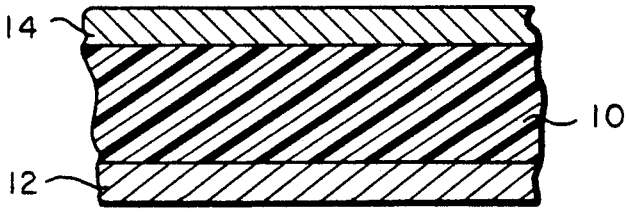
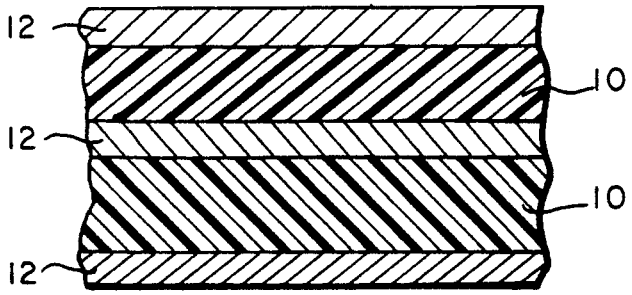
FIG. 2

COMPOSITE SHIELDS

BACKGROUND OF THE INVENTION

This invention relates to intruder resistant shields and more particularly to composite layer intruder resistant shields.

Sensitive areas such as message centers, security offices, weapons storage areas, reaction force quarters, safes, etc., require special security measures against intruders.

Conventional armor and safe materials, such as hardened steel, provide good protection against mechanical cutting devices such as power drills, saws, files, and grinding wheels. However, these materials are very vulnerable to certain conventional fire cutting devices such as oxy-acetylene torches, oxygen lances as well as the pyrotechnic devices like, e.g., pyronol torches. (Examples of pyronol and pyronol torches can be found in U.S. Pat. Nos. 3,503,841; 3,695,951; 3,713,636; and 3,890,174). The pyronol torch contains a powder mixture of nickel, aluminum, ferric oxide, and fluorocarbon (Teflon TM ), which is pelletized into a cylinderical configuration and placed into a chamber in the torch. After initiation, exothermic reaction takes place inside the torch chamber, and the molten products of the reaction are ejected at high velocity by internally generated gas pressure through a graphite nozzle. The resulting high velocity liquid metal jet has perforated aluminum, magnesium, steel, titanium, and depleted uranium plates ranging in thickness from 0.5 cm to 7.6 cm in about 0.2 seconds. Moreover, the pyronol torches have now been fabricated into hand-held devices which are very easy to use. Clearly these devices present a new security threat which must be met.

As a practical matter, weight and thickness limitations must also be considered. Thus, brute force counter measures such as using thicker steel or concrete may not be available. This is particularly true where a conventional room is to be made secure. Additionally, such a brute force approach would be costly.

Therefore, it would be desirable to provide light weight, inexpensive shielding which provide more protection against burn bars, oxygen lances, oxy-acetylene torches or pyronol or other high velocity molten metal jets. At the same time the shielding must still provide protection against the mechanical cutting devices (power drills, saws, files, and grinding wheels).

SUMMARY OF THE INVENTION

Accordingly, an object of this invention is to provide shielding which is resistant to high velocity jets of molten metals.

Moreover, an object of this invention is to provide shielding which is resistant to penetration by burn bars, oxygen lances, and oxy-acetylene torches.

Another object of this invention is to provide relatively inexpensive protective shielding materials.

A further object of this invention is to provide relatively lightweight shielding materials.

Yet another object of this invention is to provide shielding material which are resistant to mechanical cutting devices such as power drills, saws, files, or grinding wheels.

Yet a further object of this invention is to provide shields which are resistant to penetration by high velocity small arms fire.

These and other objects of this invention are accomplished by providing:

A composite shield comprising:

(1) X layers of a polymeric material selected from the group consisting of (a) polymethyl methacrylates having the basic chemical structure

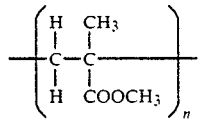

(b) polycarbonates having the basic chemical formula

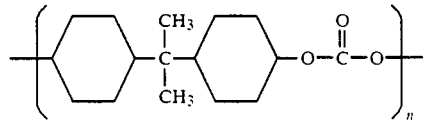

wherein each polymer layer is at least 0.375 inches thick;

(2) X+1 layers of a steel selected from the group consisting of hardened steels and stainless steels, wherein each steel layer is at least 0.175 inches thick.

(3) means for binding the layers of polymeric material and steel together;

wherein X is an integer of 1 or more.

BRIEF DESCRIPTION OF THE DRAWINGS

A more complete understanding of the invention and many of the attendant advantages thereto will be readily appreciated as the same becomes better understood by reference to the following detailed description when considered in connection with the accompanying drawings wherein:

FIG. 1 is a sectional view of a three layer intruder resistant composite shield and FIG. 2 is a sectional view of a layer intruder resistant composite shield.

DETAILED DESCRIPTION OF THE PREFERRED EMBODIMENT

The composite shield is made of alternating layers of steel and a selected polymeric material. It is desirable that both outer faces be steel. As a result, for X layers of polymeric material, X+1 layers of steel will be used and the total number of layers will be 2X+1. Referring to the drawings, FIG. 1 shows a typical three layer shield panel of a layer of stainless steel 14, a layer of Plexiglas TM 10, and a layer of harden steel 12. FIG. 2 shows a 5 layer shield panel comprising alternate layers of harder steel 12 and Plexiglas TM 10. Test data on these panels is presented in the experimental section.

The steel used is either a stainless steel or a hardened, high strength, low carbon alloy steel such as those used in safes or safe rooms. The steel should be resistant to filing, grinding, drilling etc. The steel layers should be at least 0.125 inches thick. The upper limit of the thickness is determined by practical considerations such as cost, space, and weight.

The polymeric materials used include special acrylics and polycarbonates. The acrylics used are based on polymethyl methacrylate having the basic chemical structure

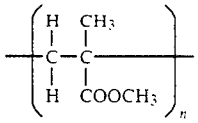

Suitable acrylics are available under the trade name Plexiglas TM from Rohm and Haas and under the trade name Lucite TM TM from E.I. du Pont de Nemour. The polycarbonates used are based on the following general chemical structure

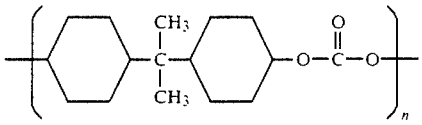

Suitable polycarbonates are available under the trade name Lexan TM from the General Electric and the trade name Merlon TM from Mobay Chemical Company. The polycarbonates are preferred because they do not suffer from aging as the acrylics do. Obviously, the polymeric materials used need not be of optical quanlity. The polymethyl methacrylate or polycarbonate layers should be at least 0.375 inches thick. Again, as with steel, the upper limit of thickness is determined by practical considerations such as cost, space, and weight.

The layers of steel and polymeric material are bonded together using conventional techniques such as bolting, clamping, or gluing. For example, a conventional urethane cement has been successfully used to fabricate 3 and 5 layer composites of steel and Plexiglas TM and of steel and Lexan TM If bolts or clamps are used, care must be taken so that they are not exposed where they can be attacked by a pyronol torch. This can be done for example by angling the composite shield.

The number of layers used is limited only by practical considerations such as cost, space available, and weight load limits. As a practical matter, the 3 and 5 layer composite shields will be used in most instances. However, additonal layers of steel and polymeric material will obviously improve the performance of the shield.

Fiberglas TM works well as a substitute for the polymethyl methacrylate or polycarbonate materials. However, Fiberglas TM expensive and therefore not the material of choice.

To more clearly illustrate this invention, the following examples are presented. It should be understood, however, that these examples are presented merely as a means of illustration and are not intended to limit the scope of this invention in any way.

EXPERIMENTAL

Examples 1 and 2 illustrate the resistance of steel-Plexiglas and steel-Lexan composites to devices such as burn bars, oxygen lances, and oxy-acetylene torches. These devices easily and rapidly cut through steel alone.

EXAMPLE 1

The burn bar was used to cut a 17.8 cm long linear cut in the steel-Plexiglas 5-ply composite. The accumulated time was 14.5 minutes; the cutting time, 8 minutes. Assuming the same rate of cutting and preparation, the accumulated time required to cut a 25 cm × 25 cm opening would be 82.8 minutes, and the cutting time, 45.7 minutes.

EXAMPLE 2

An oxygen-acetylene torch was used to cut a 25 cm × 25 cm opening in the steel-Lexan 5-ply panel. During the attack, the Lexan layer was ignited. Only the first two layers (steel and Lexan) were cut and removed. The cutting time was 12.2 minutes (8.2 minutes for the oxyacetylene torch and an additional 4 minutes for the burn bar). This time should be at least doubled in order to cut a 25 cm × 25 cm opening through the panel. Therefore, the cutting time was 24.4 minutes. The accumulated time was more than one hour. Several oxygen and acetylene tanks were replaced during this simulated attack.

Examples 3 through 15 illustrate the resistance of various materials to pyronol torches.

Composition of pyronol used

Pyronol, the powder mixture that serves as the energy source for the torch and other devices, is composed of nickel, aluminum, and iron oxide. (See U.S. Pat. No. 3,695,961 entitled "Pyrotechnic Composition," which issued to H. H. Helms, Jr., and A. G. Rozner on Oct. 3, 1972.)

Two specific thermochemical reactions take place when this mixture is initiated. The exothermic alloying reaction occurs at 660° C. when nickel and aluminum combine to form nickel aluminide, NiAl, intermetallic compound $$Ni + Al \rightarrow NiAl. \quad (1)$$

The exothermic thermitic reaction occurs at about 1480° C., when molten aluminum reduces iron oxide to form Aluminum oxide and moten iron;

$$Fe_2O_3 + 1Al \rightarrow Al_2O_3 + 2Fe \quad (2)$$

It is the combination of these two reactions that has been designated as the "pyronol" reaction. A combination of these two reactions has been used in most of the experimental work to date. Two examples of the stoichiometric mixtures are given below:

Pyronol Mix No. 1

$$Ni + 3Al + Fe_2O_3 \rightarrow Al_2O_3 + NiAl + 2Fe \quad (3)$$

Pyronol Mix No. 2

$$2Ni + 4Al + Fe_2O_3 \rightarrow Al_2O_3 + 2NiAl + 2Fe \quad (4)$$

Weight percentage compositions are given for these mixtures in Table 1. Some variation in the composition of these stoichiometric mixtures is permissible and has been briefly investigated. An increase in the nickel content will lower the overall reaction rate and reduce the peak temperature; however, it will provide an increased amount of molten metal in the reation product.

TABLE 1

PYRONOL EXOTHERMIC MATERIALS

| Pyronol Mixture | Composition (Weight %) Ni | Al | Metal Oxide | Heat of Formation H Kcal/mol | cal/gram |
|---|---|---|---|---|---|
| No. 1 ($Fe_2O_3$) | 19.6 | 27.1 | 53.3 | 237 | 792 |
| No. 2 ($Fe_2O_3$) | 30.5 | 28.0 | 41.5 | 271 | 704 |

In addition to metals and metal-oxides that are used to produce pyronol, the basic mixture used in the torches also contains a small amount of powdered Teflon TM Teflon TM serves as a lubricant to increase the green strength of the powder compact, but mainly as a gas source. Teflon TM decomposes when subjected to elevated temperatures and the expanding gases generate pressure within the torch body. It is these expanding gases that force the molten metals and oxides through the nozzle at high velocity. Teflon TM addition from 5 wt. % to 17 wt. % has been used in this program.

The particle sizes were: Aluminum, 74 microns; ferric oxide, 44 microns; nickel, 44-200 microns; and Teflon TM, 35 microns.

Torches containing pyronol charges ranging from 160 grams to 1200 grams have been constructed in which liquid jet up to 1 cm in diameter was accelerated to about 200 $ms^{-1}$. A typical torch consists of a cylindrical steel casing, pyronol charge, a graphite nozzle, an igniter, and a front closure arrangement. The pyronol charge consists of cylindrical pellets pressed from a powder mixture of nickel, aluminum, ferric oxide, and Teflon TM. These pellets are perforated in the center, and the perforation is filled with a loose powder mixture of the pyronol composition after being loaded in the torch chamber. "Holex" 1196A electrical igniter initiates the exothermic reaction between aluminum and nickel. The igniters are initiated from a battery.

The only requirement for torch initiation is that a small portion of loose powder mixture reaches the melting point of aluminum (660° C.), after which the thermochemical reaction spontaneously goes to completion. The temperature of the liquid products of the reactions is in the 2400° C. to 2800° C. range. When exposed to the high temperature, Teflon TM powder in the pyronol mixture decomposes, and the resultant gaseous products expand, thus forcing the liquid jet through a nozzle at a high velocity.

EXAMPLE 3

Steel

Pyronol torches of various sizes have been constructed and tested against a wide assortment of targets, both in ambient atmosphere and underwater. Torches as small as 4.5 cm in diameter and 18 cm long containing 180 grams of pyronol Mix No. 1 with 7.5 wt. T addition of Teflon TM have been successfully used for perforation of 2.5 cm thick steel plate and for complete severance of both sides of 1.25 cm thick chain link. Larger torches (9 cm diameter, 20 cm long containing 800 gram charge of Mix No. 1 with 7.5% wt. Teflon TM) have been used in ambient atmosphere for perforation of 5 cm thick steel plate. A similar torch demonstrated its capability to completely sever a 5 cm diameter stranded cable at underwater depths (simulated in a pressure tank) of 200 m and 400 m.)

EXAMPLE 4

Titanium alloy Ti6Al4V, is a high strength, low density structural material, it was of interest to determine the resistance of such material to perforation by pyronol jet. For this purpose, a 0.6 cm thick plate was constructed from 5 Ti6Al4V sheets (each 0.12 cm thick) that were clamped together. This plate was perforated by a jet generated in the torch containing a 200 gram pyronol charge. This test result points to the similarity in behavior of titanium and aluminum. Both metals offer only a marginal resistance to the perforation by pyronol jet.

EXAMPLE 5

Magnesium

A torch containing 200 grams of pyronol was fired at a 5.0 cm thick magnesium bar to determine the resistance of this low density metal to the pyronol jet, and to find out if the ignition of bulk magnesium will occur as the result of the pyronol jet impact.

The magnesium plate was perforated. The metal particles ejected from the crater during the jet cutting process were ignited and burned only for a few seconds. The bulk of the magnesium bar remained uneffected by the jet, thus indicating that a spontaneous combustion of bulk magnesium is unlikely to occur under an impact of the pyronol jet.

EXAMPLE 6

Plexiglas TM

A torch containing a 180 gram pyronol charge perforated a 0.6 cm thick Plexiglas TM sheet. All attempts to perforate the 1.25 cm thick plate failed. The maximum depth of penetration measured on a Plexiglas TM plate was 0.9 cm. The 0.9 cm deep crater was formed in the Plexiglas as a result of jet impact. This jet was generated in a torch containing a 800 gram pyronol charge. Similar charges will perforate a 5 cm thick steel plate. The surface of the Plexiglas plate near the crater was darkened as the result of the jet impact. In conclusion, the Plexiglas plate exhibits high resistance to the perforation by the pyronol jet.

EXAMPLE 7

Lexan TM

A torch containing 180 grams of pyronol charge was fired at a 1.25 cm thick Lexan plate. The surface of the plate was ignited by the jet and a small crater, less than 0.5 cm deep, was formed in the plate. The Lexan surface near the impact point was darkened and the transparency of the Lexan to the visible light was substantially reduced. This test result shows that Lexan and Plexiglas respond similarly to the jet impact, since the acoustic impedance of Lexan is similar. As for the acoustic impedance of Plexiglas, it is expected that the resistance of Lexan to the perforation by a pyronol jet will be similar to the resistance of Plexigas.

EXAMPLE 8

Fiberglas TM

A pyronol torch containing a 180 gram charge was fired at a 1.25 cm thick Fiberglas plate. Some surface damage and a shallow crater 0.5 cm deep was observed on the surface, but no perforation.

EXAMPLE 9

Steel-Plexiglas TM Laminates

A pyronol torch containing a 800 gram charge that is capable of perforating a two-inch thick, high strength steel plate was employed against a target consisting of a 1.2 cm thick steel plate backed up by a 1.2 cm thick layer of Plexiglas. A large opening measuring 10.0 cm×2.0 cm was obtained in the steel, but a penetration of 0.6 cm deep was observed in the Plexiglas layer.

A combination of 2.5 cm thick steel plate backed by 1.2 cm thick Plexiglas was used as a target. The Plexiglas was separated from the steel plate by a 2.5 cm wide air gap. A torch containing 300 grams of pyronol Mix No. +17 was used against the target. The steel plate was perforated and the jet traveled through the air gap before striking the Plexiglas plate. A shallow crater was formed on the surface of the Plexiglas about 0.6 cm deep and 2.5 cm in diameter; however, further passage of the jet was effectively stopped by the Plexiglas.

EXAMPLE 10

Aluminum-Plexiglas TM Laminates

Several tests have been conducted using a Plexiglas backing with an aluminum plate in front. In one test, a 1.2 cm thick aluminum plate was perforated; however, further passage of the jet was stopped by a 0.6 cm thick Plexiglas plate.

EXAMPLE 11

Steel-Lexan TM Laminates

A pyronol torch was fired at a composite armor plate consisting of a 0.6 cm thick steel plate laminated with a 0.6 cm thick layer of Lexan. The steel plate was perforated and the pyronol jet was reflected from the Lexan surface. A shallow crater was formed in the Lexan plate. This test result is in agreement with data reported on in the interaction between the pyronol jet and steel-plexiglas composites. Since the acoustic impedance of the Lexan is equal to the acoustic impedance of Plexiglas it could be expected that the steel-Lexan composite will have similar resistance to the perforation by the pyronol jet as the steel-Plexiglas laminated composite. During this test, Lexan was ignited. The surface of the Lexan plate was damaged and the transparency of Lexan to the visible light was substantially reduced.

EXAMPLE 12

Steel-Fiberglas TM Laminates

A target was constructed consisting of 0.5 inch steel plate backed by 0.5 inch thick Fiberglas plate. A torch containing a 180 gram charge was fired against this target. The 0.5 inch thick steel plate was perforated while the back-up Fiberglas plate suffered only minor damage.

EXAMPLE 13

Steel-Kevlar Laminates

Steel-Kevlar composite armor was tested as a potential barrier material against the pyronol jet. This composite consisted of 0.6 cm thick steel armor plate backed by a 1.25 cm thick layer of woven Kevlar. Several torches containing pyronol charges ranging from 200 grams to 500 grams were used in these tests. In one of the tests, steel-Kelvar composite armor was perforated by a jet generated in a pyronol torch that contained a 500 gram charge. The jet was directed normally at the steel plate and perforated both the steel and Kevlar layers. The perforation diameter in the steel layer was 2.8 cm while the perforation diameter in Kevlar ws about 1.5 cm. A jet generated in a similar size torch containing a 500 gram charge of pyronol perforated a 3.8 cm thick high strength homogeneous steel plate.

The large difference in the perforation diameter in steel and in Kevlar layers indicates that a substantial part of the jet is reflected at the steel-Kevlar interface. This is probably caused by the difference in the acoustic impedances in steel and Kevlar.

In another test, the target configuration was reversed. A jet generated in a torch that contained a 500 gram charge of pyronol was directed at the Kevlar layer, while the steel layer served as a backup plate. The jet perforated Kevlar and formed a small crater in the steel plate. The surface of Kevlar was charred The perforation diameter in Kevlar was about 1.25 cm while the crater formed in the steel was approximately 0.8 cm diameter and 0.25 cm deep.

EXAMPLE 14

Silicon Oxide-Steel and Silicon Oxide-Aluminum

High purity, low density silicon oxide was obtained from NASA and tested as a potential barrier material. Silicon oxide plates up to 5.0 cm thick have been clamped to a 2.5 thick aluminum plate and to a 1.25 cm thick steel plate. A torch containing a 200 gram charge of pyronol was fired at the surface of the silicon oxide plate in order to determine the resistance of these composites to the pyronol jet. In all the tests, the silicon oxide layer disintegrated under the jet impact, and subsequent perforation of the metallic backup plates was easily accomplished.

EXAMPLE 15

Glass and Armored Glass

A pyronol torch (180 gram charge) was fired at a 0.3 cm thick window glass plate. The jet impact fractured the glass into large fragments. Another torch containing a 180 gram charge was used against a 0.6 cm thick glass plate reinforced with a steel wire. The jet impact fractured the glass; however, the glass fragments were held together by a steel wire.

Examples 16 through 21 illustrate the ability of 3 and 5 layer steel-Plexiglas TM and steel-Lexan TM to resist penetration conventional methods such as reciprocating saw, and abrasive wheel.

EXAMPLE 16

A 5-ply steel-Plexiglas composite panel was clamped to the test stand. A reciprocating electrical saw was used to cut a 25 cm×25 cm opening in the panel. The accumulated time was 33 minutes; the actual cutting time was 26.6 minutes. During the cutting operations several blades wore out and had to be replaced.

EXAMPLE 17

An abrasive wheel was used to cut a 25 cm×25 cm opening in the steel-Plexiglas 5-ply composite panel. The accumulated time was 20 minutes, the cutting time 16.2 minutes.

EXAMPLE 18

A reciprocating saw was used to cut a 25 cm long linear cut in a 5-ply steel-Lexan-steel-Lexan-steel panel.

The accumulated time was 3 minutes, 40 seconds, and the cutting time 3 minutes, 17 seconds. The accumulated time required to cut a 25 cm×25 cm opening would be 14.7 minutes and the cutting time, 13.1 minutes.

EXAMPLE 19

An abrasive cutting wheel was used to cut a 25 cm long linear cut in the steel-Lexan 5-ply panel. The accumulated time was 5 minutes; the cutting time, 256 seconds. The accumulated time required to cut a 25 cm×25 cm opening would be 20 minutes and the cutting time, 17.1 minutes.

EXAMPLE 20

A reciprocating saw was used to cut a 25 cm long linear cut in the stainless steel-Plexiglas 3-ply panel. The total accumulated time was 12 minutes, while the cutting time was 10.0 minutes. The accumulated time required to cut a 25 cm×25 cm opening in this panel would be 48 minutes; the actual cutting time would be 40 minutes.

EXAMPLE 21

An abrasive wheel was used to cut 27 cm long linear cut in a 3-ply stainless steel-Plexiglas-steel panel. Total accumulated time for the 27 cm long cut was 3 minutes; the actual cutting time was 162 seconds. The total accumulated time required to cut a 25 cm×25 cm opening in this panel would be 11.4 minutes and the actual cutting time would be 10.3 minutes.

In addition to the tests conducted with the cutting tools and torches (Example 14 through 21), several drilling tests have been made to determine the time required to drill a hole in a composite panel with the reciprocating electric saw.

The time required to drill a hole in a composite panel is about 3 minutes. Since 2 holes have to be drilled prior to using the reciprocating electric saw, the time required to drill 2 holes must be added to the accumulated cutting times when the reciprocating saw is used. The results of these tests are summarized in Table 2.

TABLE 2

ACCUMULATED TIME (AND CUTTING TIME) REQUIRED TO CUT A 10" × 10" OPENING IN A COMPOSITE PANEL (UNCLASSIFIED)

| | FORCED ENTRY ATTACK | | | |
|---|---|---|---|---|
| BARRIER | Reciprocating Saw | Abrasive Wheel | Burn Bar (Oxygen Lance) | Oxy-acetylene Torch |
| 5 ply, 1.4 inch thick steel-Plexi-steel-Plexi- | 39 min. (32.6 min.) | 20 min. (16.2 min.) | 82.8 min. (45.6 min.) | — |
| 5 ply, 1.4 inch thick steel-Lex-steel-Lex-steel | 20.7 min. (19.1 min.) | 20 min. (17.1 min.) | — — | over 60 min. (24.4 min.) |
| 3 ply, 0.9 inch thick Stainless Steel-Plexi-Steel | 54 min. (46 min.) | 11.4 min. (10.3 min.) | — — | — — |

Numerous ballistic tests were performed on the steel-Plexiglas and steel-Lexan composites. As expected, the composites exhibited good resistance to penetration by bullets. The five layer steel-Plexiglas-steel-Plexiglas-steel composites defeated standard 7.62 mm NATO rounds.

LIST OF TRADEMARKS

Lexan is a trademark of the General Electric Company, Polymers Product Division.

Merlon is a trademark of the Mobay Chemical Company.

Plexiglas is a trademark of Rohm and Haas Company.

Lucite, Kevlar, and Teflon are trademarks of E.I. du Pont de Nemours Company.

Fiberglas is a trademark of Owens-Corning Fiberglas Corporation.

Obviously, numerous modifications and variations of the present invention are possible in light of the above teachings. It is therefore to be understood that within the scope of the appended claims the invention may be practiced otherwise than as specifically described herein.

We claim:

1. A composite shield comprising:

(1) X layers of a polymeric material selected from the group consisting of (a) polymethyl methacrylates having the basic chemical structure

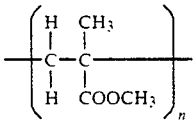

and (b) polycarbonates having the basic chemical formula

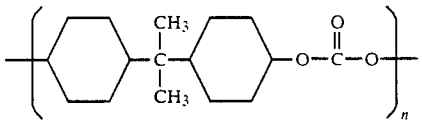

wherein n>1 and wherein each layer of polymeric material is at least 0.375 inches thick;

(2) X+1 layers of a steel selected from the group consisting of hardened low carbon steels and stainless steel, wherein each steel layer is at least 0.175 inches thick;

(3) means for binding the layers of polymeric material and steel together;

wherein X is an integer of 1 or more.

2. The composite shield of claim 1 wherein the polymeric material is a polymethyl methacrylate.

3. The composite shield of claim 1 wherein the polymeric material is a polycarbonate.

4. The composite of claim 1 wherein the steel is a stainless steel.

5. The composite of claim 1 wherein the steel is a hardened low carbon steel.

6. The composite of claim 1 wherein X is an integer of from 1 to 100.

7. The composite of claim 6 wherein X is an integer of from 1 to 10.

8. The composite of claim 7 wherein X is 2.

9. The composite of claim 7 wherein X is 1.

* * * * *